United States Patent [19]

Kasahara

[11] Patent Number: 5,493,546
[45] Date of Patent: Feb. 20, 1996

[54] OPTICAL DISK APPARATUS FOR OPTICALLY PROCESSING INFORMATION

[75] Inventor: Akihiro Kasahara, Kawasaki, Japan

[73] Assignee: Kabushiki Kaisha Toshiba, Kawasaki, Japan

[21] Appl. No.: 277,969

[22] Filed: Jul. 20, 1994

Related U.S. Application Data

[62] Division of Ser. No. 163,728, Dec. 9, 1993, Pat. No. 5,361,243, which is a continuation of Ser. No. 751,083, Aug. 28, 1991, abandoned.

[30] Foreign Application Priority Data

Aug. 29, 1990 [JP] Japan ................... 2-225360

[51] Int. Cl.$^6$ ............................... G11B 7/12
[52] U.S. Cl. .................. 369/44.15; 369/44.16; 369/44.14; 359/813; 359/823
[58] Field of Search ............... 369/44.15, 44.16, 369/44.14, 44.11, 44.22; 359/813, 814, 823, 824; 250/201.5

[56] References Cited

U.S. PATENT DOCUMENTS 5,218,587  6/1993  Nomiyama et al. ............ 369/44.16

FOREIGN PATENT DOCUMENTS 0314200  5/1989  European Pat. Off. .
0442443  8/1991  European Pat. Off. .
3839708  9/1989  Germany .

*Primary Examiner*—Ali Neyzari
*Assistant Examiner*—Muhammad N. Edun
*Attorney, Agent, or Firm*—Oblon, Spivak, McClelland, Maier & Neustadt

[57] ABSTRACT

In an optical disk apparatus, an objective lens 29 is suspended movably along its optical axis by diaphragm structures and mounted on a carrier. The carrier is movably mounted on guide rails by a pair of support structures. In each of the support structures, two pair of rollers are rotatably fixed on first and second blocks, respectively, which are fixed to both ends of a leaf spring. The center portion of the leaf spring is fixed to the side surface of the carrier and gaps are provided between both ends of the leaf spring and the side surface of the carrier.

12 Claims, 15 Drawing Sheets

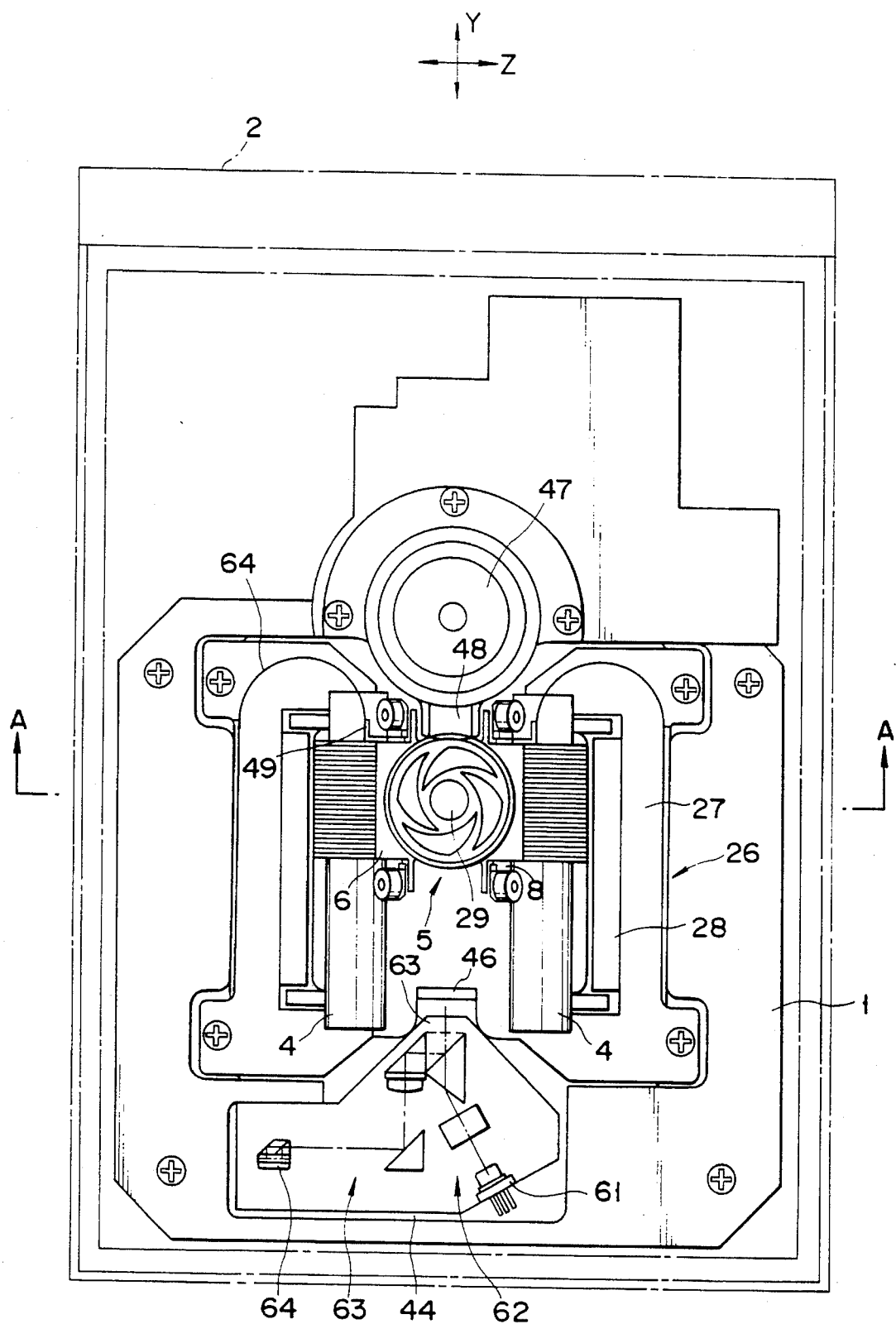
F I G. 5

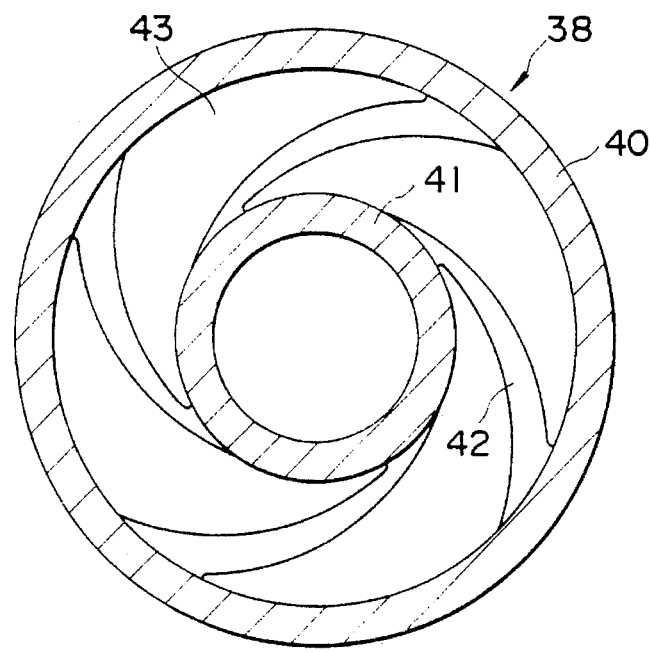
F I G. 14A
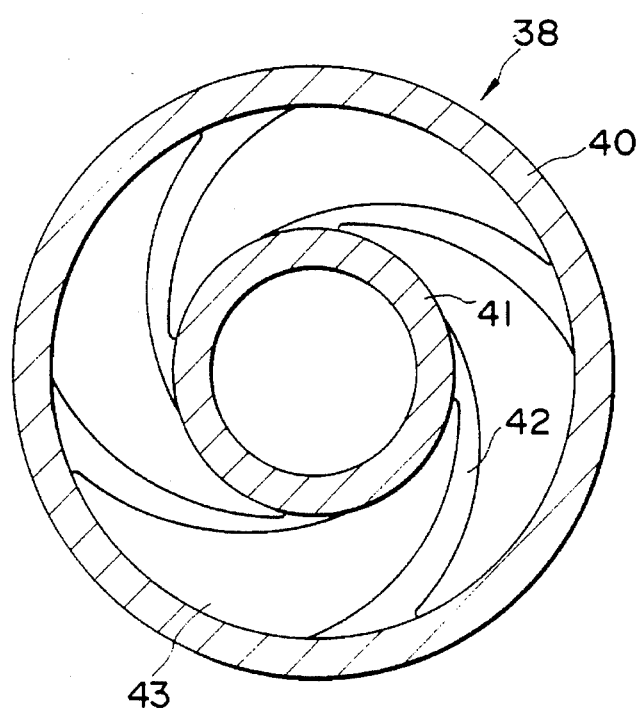
F I G. 14B

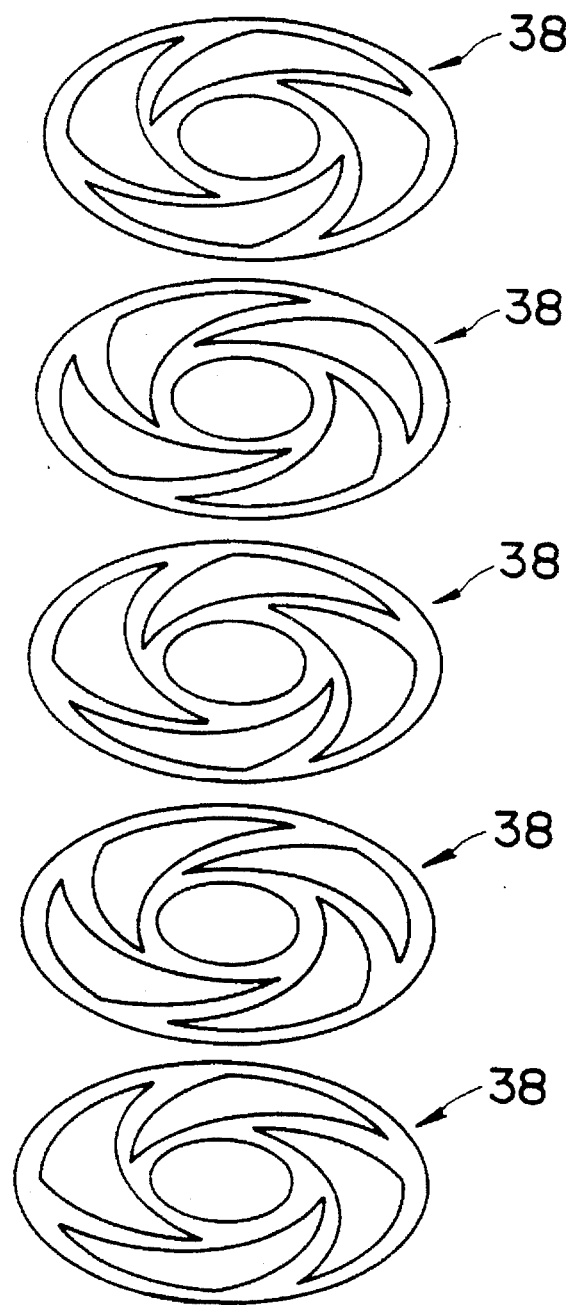
F I G. 15

OPTICAL DISK APPARATUS FOR OPTICALLY PROCESSING INFORMATION

This is a division of application Ser. No. 08/163,728, filed on 12/09/93, now U.S. Pat. No. 5,361,243 which is a continuation of application Ser. No. 07/751,083, filed on 08/28/91, now abandoned.

BACKGROUND OF THE INVENTION

1. Field of the Invention

The present invention relates generally to an optical disk apparatus for optically processing information, and more particularly to an optical disk apparatus capable of optically reading/writing information at high speed.

2. Description of the Related Art

An optical disk apparatus for optically recording information on an optical information recording medium such as an optical disk or an optical-magneto disk, or optically reproducing information from the optical information recording medium has a much greater memory capacity than a magnetic disk apparatus, etc. Thus, the optical disk apparatus will be widely used as an information recording/reproducing apparatus in near future.

In the optical disk apparatus, a light beam emitted from a light source is converged on a recording surface of an optical disk through an objective lens when optical information is reproduced, a light beam having a predetermined intensity is modulated on the recording surface of the optical disk and reflected from the recording surface. The reflected beam is detected to reproduce the optical information. When information is recorded, the light beam emitted from the light source is modulated to write optical information on the optical disk. In this optical disk apparatus, the objective lens is supported movably along the optical axis for focus control, and moved in the focusing direction. In addition, the objective lens is supported movably along the surface of the optical disk in a direction perpendicular to the optical axis for information access and tracking control, and is moved in a radial direction, i.e. tracking direction. Specifically, the objective lens is kept in the focused state, and the light beam is converged on the recording surface of the optical disk so that a minimum beam spot is formed on the recording surface of the optical disk. Further, the objective lens is kept in the tracking state, thereby enabling a light beam to trace a desired track on the optical disk, e.g. a tracking guide or a tracking guide sequence. The objective lens is kept in the focused state or in the tracking state, so that the light beam is intensity-modulated, thereby recording information on the surface of the optical disk, or the information is reproduced by detecting the beam reflected from the optical disk through the objective lens.

For example, Published Unexamined Japanese Patent Application No. 63-1317 discloses a conventional optical disk apparatus, which is shown in FIGS. 1 to 4. In the optical disk apparatus, a frame 101 is provided within a housing of the optical disk apparatus. The housing is fixed by means of four leg members 102 and 103. The frame 101 extends in the Y-direction. A pair of cylindrical steel support rails 105 and 106 are distanced in the Z-direction and fixed at both ends of the frame 101. An elongated pick-up body 107 extending in the Z-directionare arranged between the support rails 105 and 106 and supported movably by the rails 105 and 106. One side end of the pick-up body 107 is provided with two steel rollers 108 which roll over the support rail 105, and the other side end of the pick-up body 107 are provided with two pairs of steel rollers 109. One pair of the two pairs of rollers 109 are distanced from the other in a direction in which the pick-up body 107 moves. The rollers 109 are supported by the other support rail 106. As seen from FIG. 4, the pick-up body 107 is supported by the support rails 105 and 106 at three support points where the rollers 108 and 109 are provided.

As shown in FIG. 1, each roller 108 provided at one side end of the pick-up body 107 is attached at a free end portion of a lever 112. The lever 112 is attached on the pick-up body via a pin 111 and is swingable in the direction of arrow R. The direction of arrow R is perpendicular to the direction in which the pick-up body moves (i.e. Y-direction and a direction opposite to Y-direction). A spring member 113 is provided to press the roller 108 on the support rail 105. Since the rollers 108 (situated at one of the three support points) are pressed on the rail 105, the other rollers 109 (situated at the other support points) are also pressed on the support rail 106 by reaction force. As shown in FIGS. 1 and 2, the frame 101 is provided with a pair of longitudinal magnetic circuits 120, each comprising a longitudinal magnet 116 and longitudinal yokes 117 and 118 engaged with one another and all extending in the direction in which the pick-up body 107 extends (Y-direction and a direction opposite thereto). As shown in FIG. 2, a pair of drive coils 121 are attached to the pick-up body 107. The coils 121 extend in parallel to the direction in which the pick-up body 107 moves. The magnetic circuits 120 generate magnetic fluxes crossing the drive coils and constitute, along with the drive coils, a linear motor for applying a moving force to a moving optical system including the pickup body 107.

However, the optical disk apparatus shown in FIGS. 1 to 4 have the following problems.

Since the rollers 108 and rollers 108 are arranged outside the drive coils 121, mass distribution increases at both end portions of the pick-up body 107. As a result, the resonance frequency of the pick-up body 107 decreases, and wide-band control operation necessary for high-speed access becomes unstable. In order to solve this problem, it is possible to set the driving center at the node of oscillation; however, in order to set the driving center at the node, it is necessary to further increase the mass at both ends of the pick-up body. Consequently, the driving acceleration speed lowers.

As shown in FIG. 3, an actuator for finely moving an objective lens 158 in a focusing direction (arrow F) and a tracking direction (arrow T) is mounted on the pick-up body 107. Thus, when the pick-up body 107 is moved at high speed for access, it is necessary to apply a force in the T-direction to cancel the acceleration of the pick-up body 107, thereby preventing the objective lens 158 from vibrating. This increases power consumption of the entire apparatus.

The pins for rotatably supporting the rollers are firmly attached on the metallic pick-up body 107. The four pins for the rollers 108 and one pin for one of the rollers 108 are firmly fixed on the pick-up body 107 and allow freedom of rotation. The other roller 108 for applying pre-load is pressed on the support rail 105. Thus, the angle of inclination of the pick-up body 107 is denifitely determined by the precision of attachment of the rollers excluding the roller 108 for pre-pressing and by the precision of attachment of the support rails 105 and 106, and there is no room for adjustment.

Since the optical disk apparatus is so constructed that the vibration occurring in the pick-up body cannot be damped between the rollers and the pick-up body 107, abnormal vibration may occur and it is difficult to achieve stable control operation.

SUMMARY OF THE INVENTION

The object of the present invention is to provide an optical disk apparatus capable of accessing a target track quickly, and carrying out high-precision stable focus control and tracking control.

According to the present invention, there is provided an optical disk apparatus wherein an objective lens is moved in the radial direction of an optical disk, a movable optical body supporting the objective lens is supported by four roller units, each roller unit comprising two rollers, two pins and a roller block, each roller unit being supported at one end of an elastic body, and the other end of the elastic body being fixed to a pick-up body of the movable optical body.

In addition, according to this invention, there is provided an optical disk apparatus wherein an objective lens is moved in the radial direction of an optical disk, a movable optical body supporting the objective lens is supported by four roller units, each roller unit comprising two rollers, two pins and a roller block, each roller unit being fixed at both ends of an elastic body, and a center part of the elastic body is fixed to the pick-up body of the movable optical body.

The elastic body for supporting the roller unit may be constituted by a plate spring element having a plane substantially parallel to the direction in which the movable optical body moves. Alternatively, the elastic body for supporting the roller unit may be constituted by a parallel spring element having a plane substantially parallel to the direction in which the movable optical body moves.

The roller unit may comprise a resin block, steel pins and steel rollers, and the plate spring element or parallel spring element, block and pins may be integrally formed by injection molding. Alternatively, the roller unit may comprise a resin block, steel pins and steel rollers, the plate spring element may be formed of the same resin as the block, and the plate spring, block and pins may be integrally formed by injection molding.

Gaps of less than 1 mm may be provided between the roller block and the pick-up body of the movable optical body. After the support unit comprising the roller unit and the elastic body is fixed to the pick-up body of the movable optical body, at least two of the gaps may be filled with a thermosetting, room temperature setting, or photo-setting adhesive or filler. Alternatively, gaps of less than 1 mm may be provided between the roller block and the pick-up body of the movable optical body, and, after the support unit comprising the roller unit and the elastic body is fixed to the pick-up body of the movable optical body, at least one of the gaps may be filled with a visco-elastic agent such as silicone gel.

The plate spring and the pick-up body of the movable optical body may be formed of a metallic material, and the pick-up body of the movable optical body and the plate spring may be fixed by welding means such as electric spot welding or laser spot welding. Alternatively, the plate spring may be formed of a metallic material, the metallic elements of the pick-up body may be formed of out-sert or insert resin, the metallic portion may be exposed at the connecting portion with the plate spring, and the carriage and the plate spring may be fixed by means of welding means such as electric spot welding or laser spot welding.

The plate spring element of the support unit may be fixed between the pick-up body of the optical movable body and the coil for driving the movable optical body, the roller unit may be situated outside the coil end, and the yoke penetrating the coil may function as the roller guide shaft. Alternatively, the plate spring element of the support unit may be fixed between the pick-up body of the movable optical body and the coil for driving the movable optical body, the roller unit may be situated outside the coil end, and the yoke penetrating the coil may be provided with a V-groove in which the roller guide shaft is to be fixed.

The drive center of the movable optical body on which the objective lens is mounted may coincide substantially with the center of figure of the surface of the stopper which contacts with the pick-up body of the movable optical body. In the movable optical body on which parts of optical elements including the objective lens and mirror unit are mounted and on which other optical elements including the laser diode and photodetector are not mounted, it is possible that the center of the light passage between the optical element on the carriage and the optical element on the stationary unit passes through the center of gravity of the entire movable optical body, a ring-like stopper is provided between the movable optical body and the stationary optical element, and the drive center of the movable optical body may coincide with the center of figure of the surface of the stopper which contacts with the pickup body of the movable optical body.

A stopper may be provided on the spindle motor.

In an optical disk apparatus wherein a focus unit for driving the objective lens in the focusing direction and a movable optical body, on which at least part of the focus unit and optical elements is mounted, are movable in the radial direction of the disk, it is possible that the focus unit comprises two or more yokes, a magnet, two diaphragm springs and a ring, one of the diaphragm springs is clamped by the two yokes, and one of the yokes has a spherical seat and is fixed to the pick-up body of the movable optical body.

It is possible that one of the yokes is situated between the two diaphragm springs, and a coil wound around a bobbin supporting the objective lens is situated between the two diaphragm springs.

It is possible that the diaphragm spring and the ring for fixing the outer periphery of the diaphragm spring are made of metallic material, and the diaphragm spring and ring are coupled by means of welding means such as laser spot welding or electric spot welding.

In an optical disk apparatus wherein a focus unit for driving the objective lens in the focusing direction and a movable optical body, on which at least part of the focus unit and optical elements is mounted, are movable in the radial direction of the disk, it is possible that the focus unit comprises at least two diaphragm spring units, and each diaphragm spring unit is constituted by laminating a plurality of diaphragm springs rotated about the center of the diaphragm at different phases.

A plurality of diaphragm springs may be coupled by diffusion coupling to constitute the diaphragm unit.

In an optical disk apparatus wherein an objective lens is moved in the radial direction of an optical disk, a movable optical body on which the objective lens is mounted is constituted such that the movable optical body is supported by four roller units, each roller unit comprises two rollers, two pins and a block, each unit is supported at one end of an elastic body, and the other end of each elastic body is fixed to the pick-up body of the movable optical body. Thus, the movable optical body is engaged with a shaft via the elastic body and high-frequency vibration of the shaft is not transmitted to the movable optical body. Therefore, stable control operation can be attained.

In an optical disk apparatus wherein an objective lens is moved in the radial direction of an optical disk, a movable optical body on which the objective lens is mounted is constituted such that the movable optical body is supported by four roller units, each roller unit comprises two rollers, two pins and a block, the roller unit is fixed at both ends of an elastic body and a center portion of the elastic body is fixed to the pick-up body of the movable optical body. Thus, the movable optical body is engaged with a shaft via the elastic body and high-frequency vibration of the shaft is not transmitted to the movable optical body. Therefore, stable control operation can be attained. In addition, since the elastic body is coupled to the carriage at the center portion of the elastic body, a stress does no concentrate at the coupling portion, and the coupling is firm.

Since the elastic body for supporting the roller unit is constituted by a plate spring element having a plane substantially parallel to the direction in which the movable optical body moves, the rigidity in the direction of movement is high and abnormal vibration hardly occurs at the time of high-speed access.

Alternatively, since the elastic body for supporting the roller unit is constituted by a parallel plate spring element having a plane substantially parallel to the direction in which the movable optical body moves, the rigidity in the direction of movement is high and abnormal vibration hardly occurs at the time of high-speed access. In addition, even when the plate spring is deformed to apply a pre-load to the roller unit, the angular relationship between the roller shaft and the shaft is kept constant. Thus, the rolling resistance due to an angle variation does not increase, and smooth movement is attained.

Since the roller unit comprises a resin block, steel pins and steel rollers, and the plate spring element or parallel spring element, block and pins are integrally formed by injection molding, the relative position and relative angle of each pin can be kept constant. Thus, the rolling resistance due to a positional displacement or an angle variation does not increase, and smooth movement is attained.

The roller unit comprises a resin block, steel pins and steel rollers, the plate spring element is formed of the same resin as the resin block, and the plate spring element, block and pins are integrally formed by injection molding. Thus, the relative position and relative angle of each pin can be kept constant, the rolling resistance due to a positional displacement or an angle variation does not increase, and smooth movement is attained.

The gaps of less than 1 mm are provided between the roller block and the pick-up body of the movable optical body and, after the support unit comprising the roller unit and the elastic body is fixed to the pick-up body of the movable optical body, at least two of the gaps are filled with a thermosetting, room temperature setting, or photo-setting adhesive or filler. Thus, after assembly, the inclination angle of the movable optical body is adjusted by utilizing the elasticity of the elastic body, thereby setting the optical axis at an optimal angle. Thereafter, at least two of the gaps are filled with a thermosetting, room temperature setting, or photo-setting adhesive or filler, and the desired state of the optical axis can be maintained.

The gaps of less than 1 mm are provided between the roller block and the pick-up body of the movable optical body, and, after the support unit comprising the roller unit and the elastic body is fixed to the pick-up body of the movable optical body, at least one of the gaps is filled with a visco-elastic agent such as silicone gel. Thus, the vibration of the movable optical body can effectively be damped, and high-precision control operation can be carried out.

The plate spring and the pick-up body of the movable optical body are formed of a metallic material, and the pick-up body of the movable optical body and the plate spring are fixed by caulking or welding means such as electric spot welding or laser spot welding. Thus, the movable optical body can be firmly coupled to the pick-up body. Alternatively, the plate spring is formed of a metallic material, the metallic elements of the pick-up body are formed of out-sert or insert resin, the metallic portion is exposed at the connecting portion with the plate spring, and the carriage and the plate spring are fixed by means of caulking or welding means such as electric spot welding or laser spot welding. Thus, the movable optical body and the pick-up body can be firmly coupled, and the insulating property of the coil can be enhanced.

The plate spring element of the support unit is fixed between the pick-up body of the optical movable body and the coil for driving the movable optical body, the roller unit is situated outside the coil end, and the yoke penetrating the coil functions as the roller guide shaft. Thus, the support point of the movable optical body can be approached to the drive point for driving the movable optical body, and the occurrence of abnormal resonance can be prevented.

The plate spring element of the support unit is fixed between the movable optical body and the coil for driving the movable optical body, the roller unit is situated outside the coil end, and the yoke penetrating the coil is provided with a V-groove in which the roller guide shaft is to be fixed. Thus, the support point of the movable optical body can be approached to the drive point for driving the movable optical body, and the occurrence of abnormal resonance can be prevented. In addition, the contact layer between the V-groove and the guide shaft can effectively damp the vibration of the shaft, and high-precision control operation can be carried out.

The drive center of the movable optical body on which the objective lens is mounted coincides substantially with the center of figure of the surface of the stopper which contacts with the pick-up body of the movable optical body. Thus, when the pick-up body of the movable optical body collides with the stopper, the moment to rotate the movable optical body does not occur and the bearings are not damaged.

In the movable optical body on which parts of optical elements including the objective lens and mirror unit are mounted and on which other optical elements including the laser diode and photodetector are not mounted, the center of the light passage between the optical element on the pick-up body of the movable optical body and the optical element on the stationary unit passes through the center of gravity of the entire movable optical body, a ring-like stopper is provided between the movable optical body and the stationary optical element, and the drive center of the movable optical body may coincide with the center of figure of the surface of the stopper which contacts with the pick-up body of the movable optical body. Thus, when the pick-up body of the movable optical body collides with the stopper, the moment to rotate the movable optical body does not occur and the bearings are not damaged.

Since the stopper is provided on the spindle motor, the distance between the spindle motor and the movable optical body can be set with high accuracy, and the movable optical body does not collide with the spindle motor.

In an optical disk apparatus wherein a focus unit for driving the objective lens in the focusing direction and a movable optical body, on which at least part of the focus unit and optical elements is mounted, are movable in the radial direction of the disk, it is possible that the focus unit comprises two or more yokes, a magnet, two diaphragm springs and a ring, one of the diaphragm springs is clamped by the two yokes, and one of the yokes has a spherical seat and is fixed to the pick-up body of the movable optical body. Thus, an objective lens support system with an inclination adjusting function and high rigidity in radial direction can be obtained.

One of the yokes is situated between the two diaphragm springs, and a coil wound around a bobbin supporting the objective lens is situated between the two diaphragm springs. Thus, the yoke functions as a mechanical stopper, and the objective lens is prevented from excessively projecting to damage the recording medium. Further, since the coil is situated between the two diaphragm springs, the rigidity in radial direction can be enhanced.

The diaphragm spring and the ring for fixing the outer periphery of the diaphragm spring are made of metallic material, and the diaphragm spring and ring are coupled by means of welding means such as laser spot welding or electric spot welding. Thus, an objective lens support system with high rigidity in radial direction can be obtained.

In an optical disk apparatus wherein a focus unit for driving the objective lens in the focusing direction and a movable optical body, on which at least part of the focus unit and optical elements is mounted, are movable in the radial direction of the disk, the focus unit comprises at least two diaphragm spring units, and each diaphragm spring unit is constituted by laminating a plurality of diaphragm springs rotated about the center of the diaphragm at different phases. Thus, an objective lens support system with high rigidity in radial direction can be obtained.

Since a plurality of diaphragm springs are coupled by diffusion coupling to constitute the diaphragm unit, an objective lens support system with high rigidity in radial direction can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a plan view showing an optical disk apparatus according to embodiment 1 of the present invention;

FIGS. 14A and 14B are plan views for illustrating the state of lamination of the diaphragm spring shown in FIG. 13;

FIG. 15 is a perspective view illustrating the lamination of the diaphragm spring shown in FIG. 13;

DETAILED DESCRIPTION OF THE PREFERRED EMBODIMENTS

Embodiments of the optical disk apparatus according to the present invention will now be described with reference to the accompanying drawings.
Embodiment 1

Figure 1:
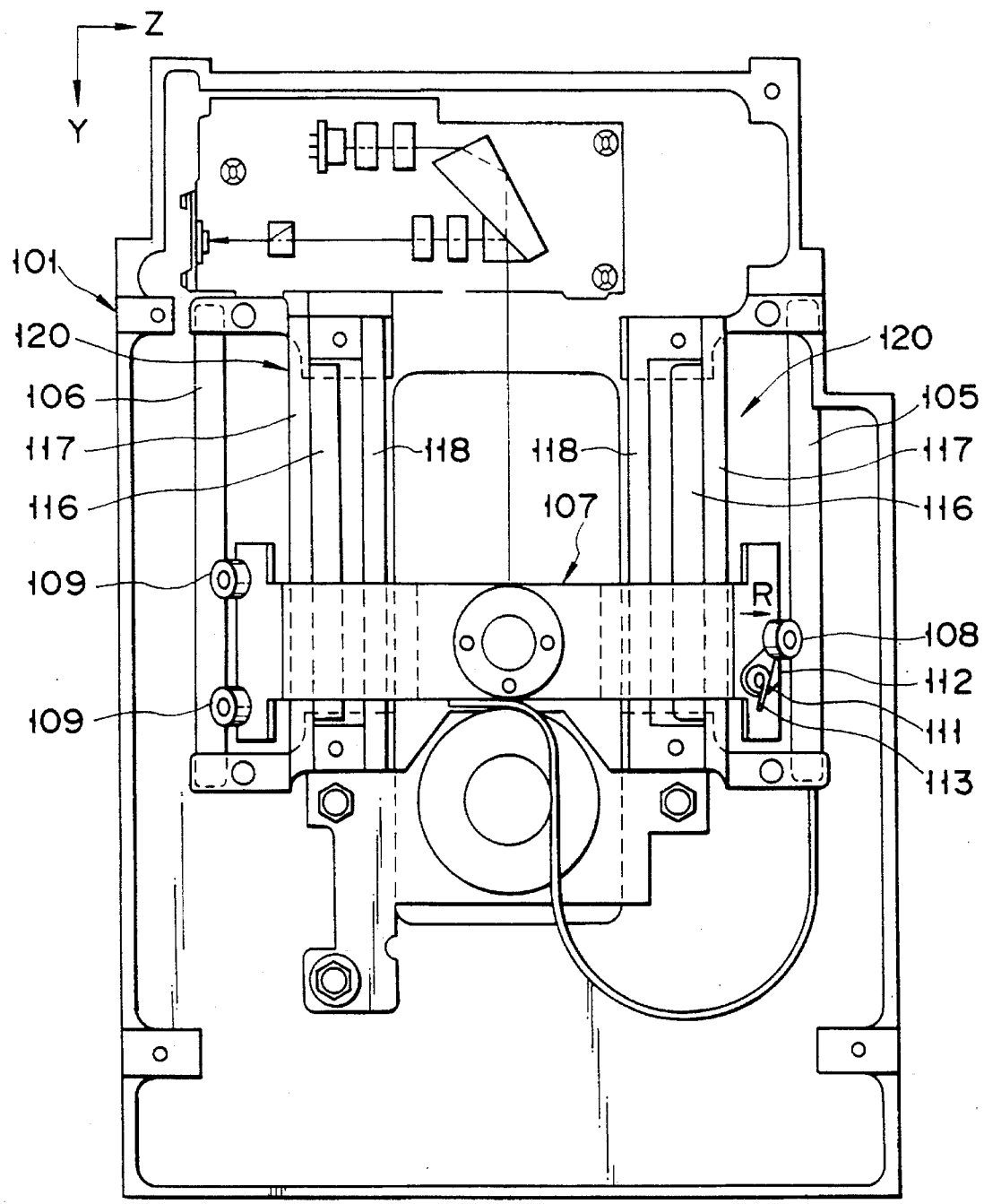
FIG. 1 is a plan view showing schematically a conventional optical disk apparatus.
Figure 2:
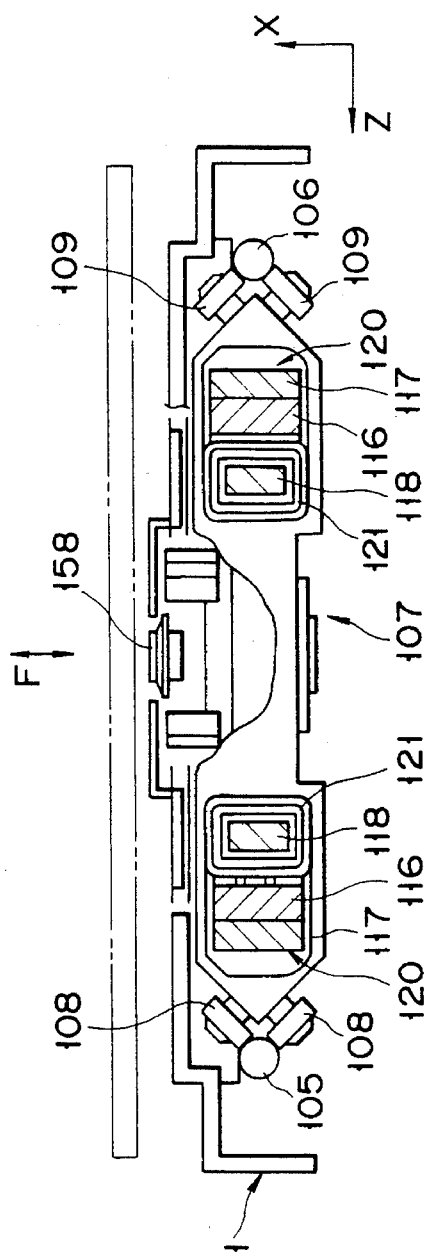
FIG. 2 is a cross-sectional view taken along the Z-axis in FIG. 1.
Figure 3:
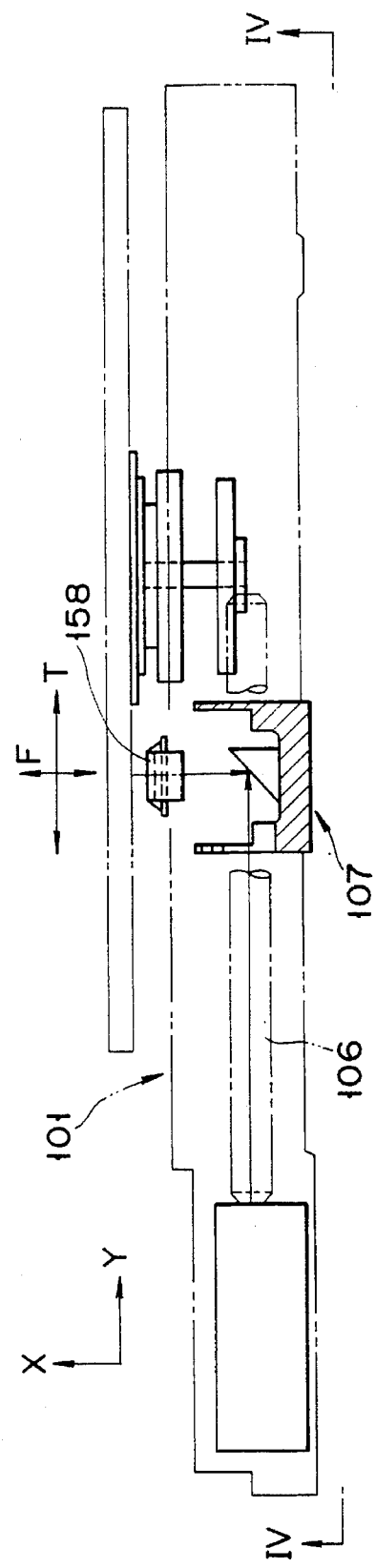
FIG. 3 is a cross-sectional view taken along the Y-axis in FIG. 1.
Figure 4:
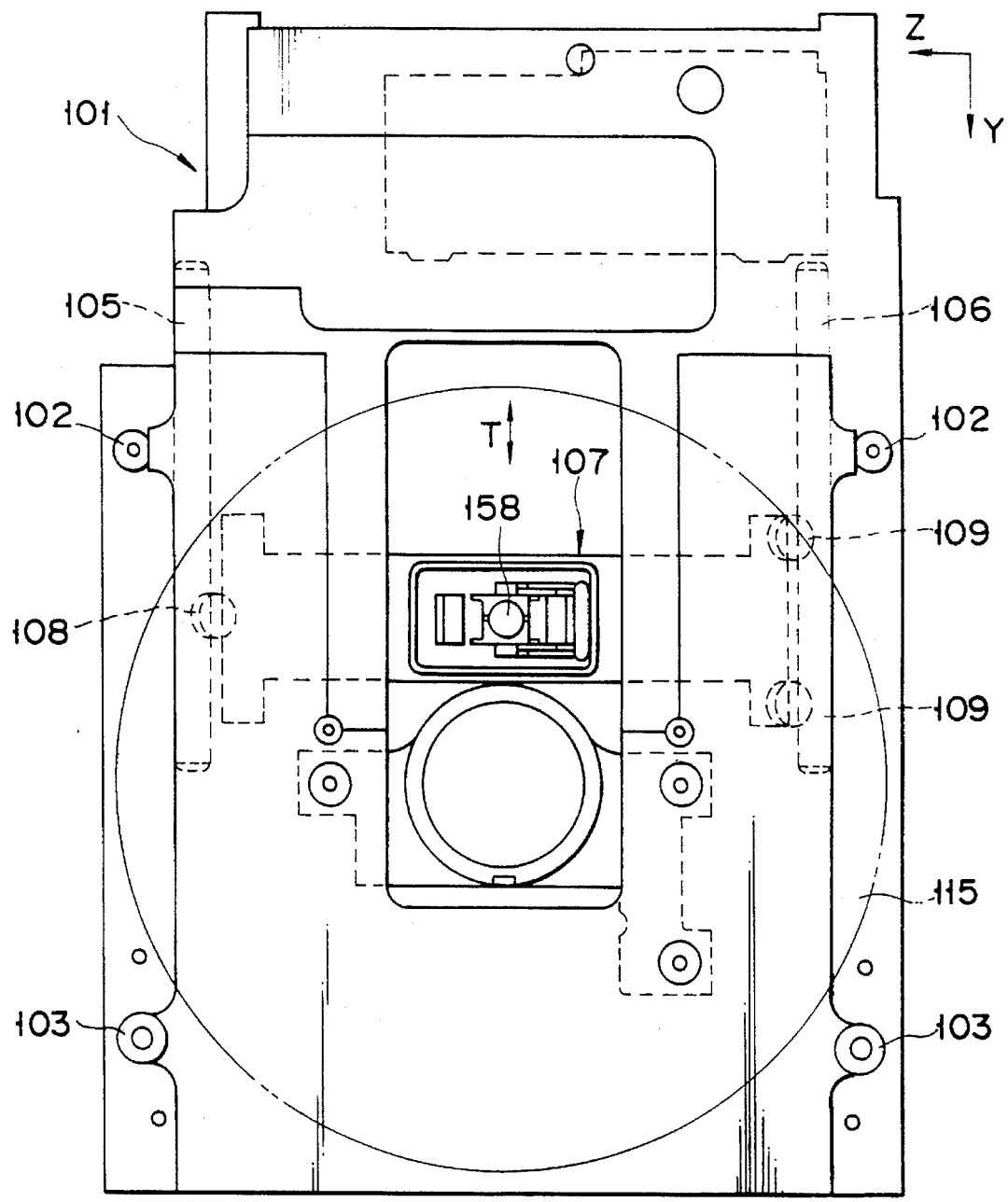
FIG. 4 is a plan view of the optical disk apparatus of FIG. 1, with part of the pick-up body removed.
Figure 6:
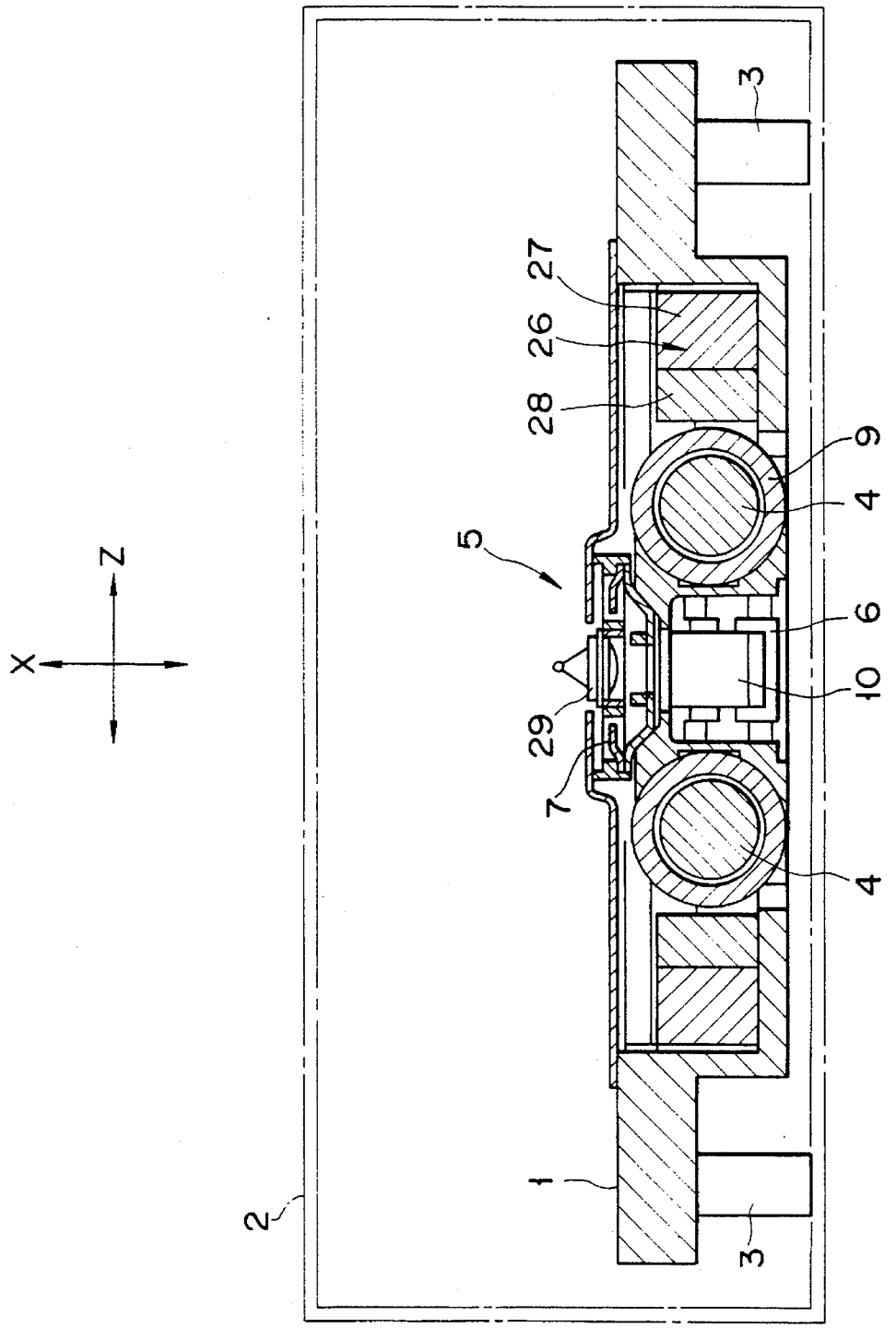
FIG. 6 is a cross-sectional view taken along line A—A in FIG. 5.

FIG. 5 is a plan view showing an optical disk apparatus according to a first embodiment of the present invention, and FIG. 6 is a cross-sectional view taken along line A—A in FIG. 5. As shown in FIGS. 5 and 6, a frame 1 is provided within a housing 2 of the optical disk apparatus. The frame 1 is fixed within the housing such that four leg members 3 arranged within the housing 2 are screwed at four corners of the frame 1.

Figure 7:
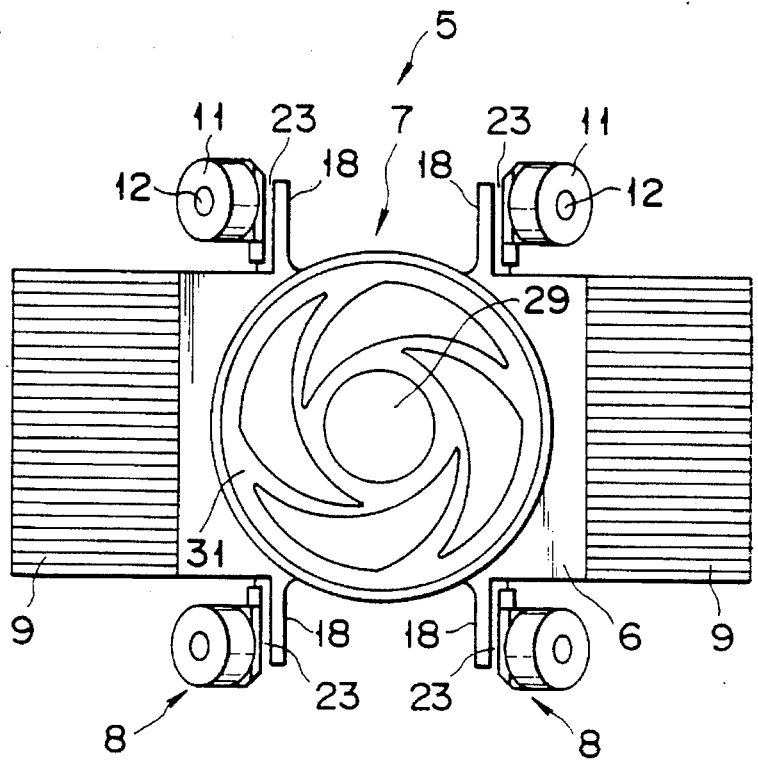
FIG. 7 is a plan view showing schematically a movable optical body shown in FIG. 1.

A pair of cylindrical magnetic support rails or guide shafts 4, which extend in parallel in the Y-direction with a distance in the Z-direction, are fixed to the frame 1. A movable optical body or carriage unit 5, as shown in FIG. 7, is movably supported by the support rails or guide shafts 4. The movable optical body 5 comprises, as shown in FIG. 7, a focus unit 7 fixed on the pick-up body 6 to support an objective lens 29 movably in the direction of the optical axis or X-direction, two pairs of support units 8 fixed to the pick-up unit 6 for supporting the pick-up unit 6 on the support rails 4, two radial coils for generating a driving force for driving the pick-up body 6, and a mirror unit 10 fixed to the pick-up unit 6 and situated along the light path defined within the pick-up body 6 for directing a light beam to the objective lens and directing the light beam reflected from a recording surface 39 of the optical disk to a detection optical system.

Figure 8:
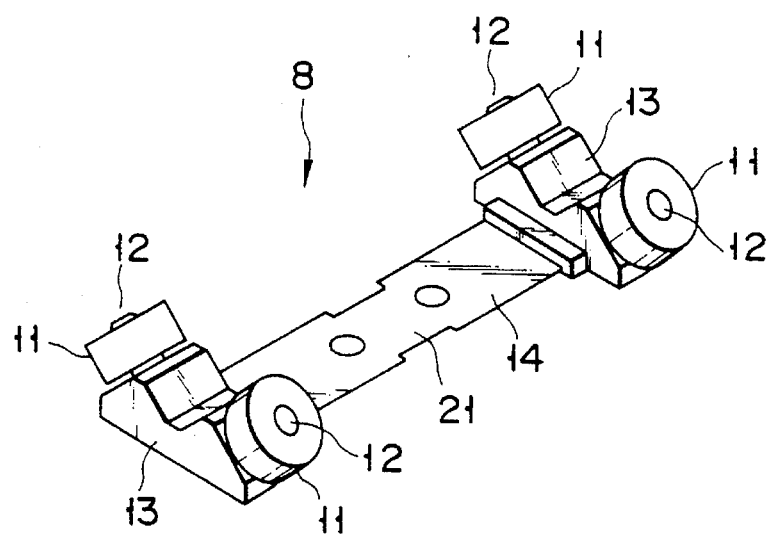
FIG. 8 is a perspective view showing a support unit for the movable optical body shown in FIG. 7.

In the support unit 8, as shown in FIG. 8, two pairs of steel rollers 11, which roll over the support rails or guide shafts 4, are rotatably supported on two pairs of pins 12. Each pair of pins 12 are fixed on a roller block 13 so that the center axes thereof cross each other. The two roller blocks 13 are coupled by a plate spring 14. The roller blocks 13 are made of a high-rigidity engineering plastic material, in such a manner that four pins 12 and plate spring 14 are fixed in a mold and the plastic material is injected in the mold.

Figure 9:
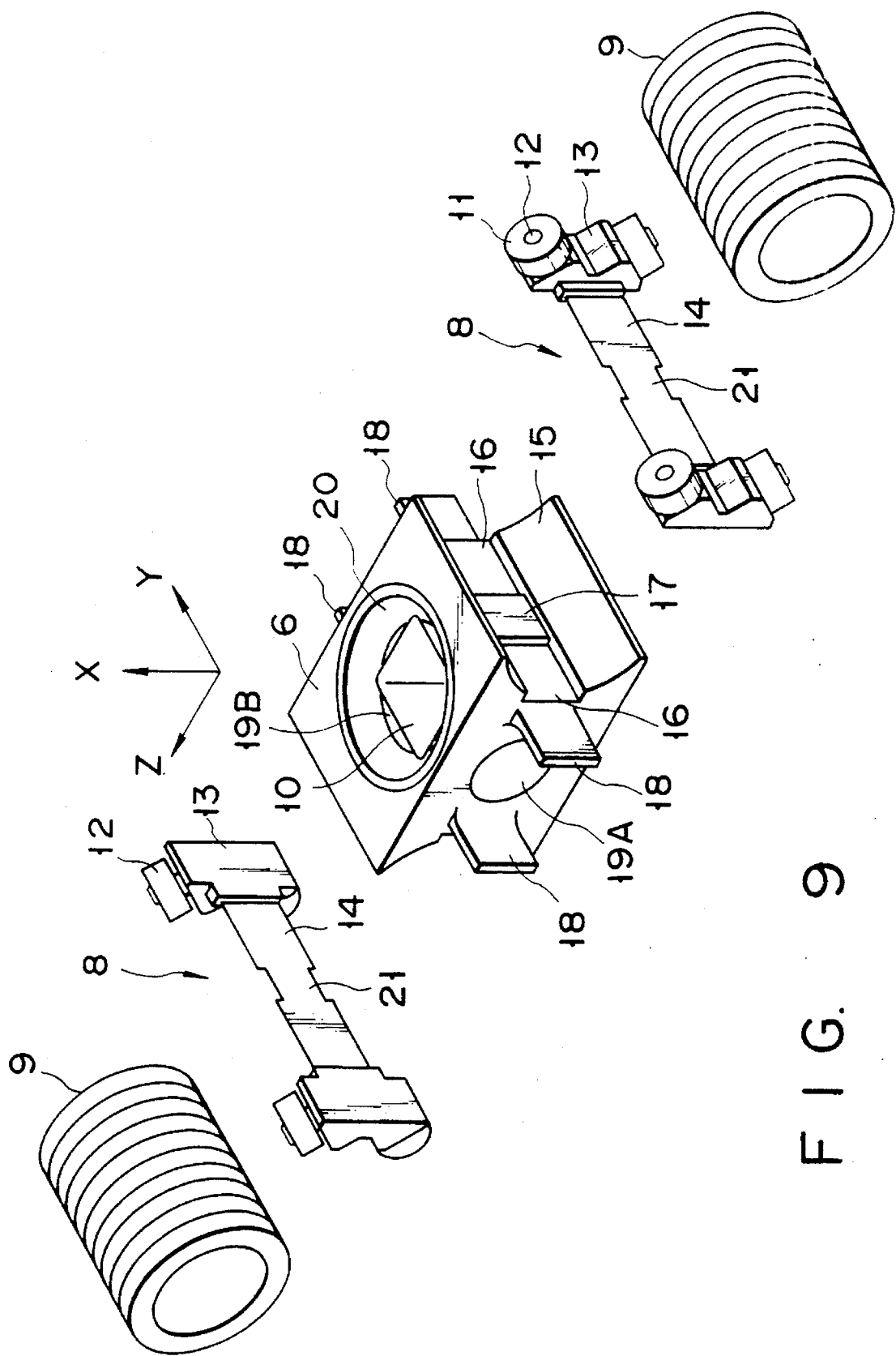
FIG. 9 is an exploded perspective view of the movable optical body shown in FIG. 7.

As is shown in FIG. 9, the pick-up body 6 is formed symmetrical with respect to an XY-plane. In addition, the external appearance of the pick-up body 6 is substantially symmetrical with respect to an XZ-plane. Both side portions of the pick-up body 6 along the axis of Z-direction are provided with cylindrical curved faces 15 for receiving cylindrical radial coils 9. The radial coils 9 are attached to the curved faces 15. Grooves 16 extending in Y-direction are provided on the inside of the curved faces 15. Shallower grooves 17 are formed at middle parts of the grooves 16. A pair of support unit stoppers 18 extending substantially in Y-direction are formed on each of both side portions of the body 16 along the axis of Y-direction. A hole 19A for guiding a light beam is formed in at least one of the side surfaces along the axis of Y-direction. The hole 19A communicates with a hole 19B formed in the upper surface along the axis of X-direction. A total-reflection prism 10 for guiding the light beam to the objective lens 29 is fixed in the hole 19A. A spherical seat 20 to be engaged with the focus unit 7 (described later by reference to FIG. 12) is provided on the upper surface along the axis of X-direction.

The pick-up body 6 is fixed to support units 8 by means of adhesion, welding, screwing or caulking, while center portions 21 of plate springs 14 of support units are situated in the grooves 17 at the side faces of pick-up body 6. In order to perform welding, it is, at least, necessary that the plate springs 14 and grooves 17 are made of a metal. In this case, the plate springs 14 and grooves 17 are coupled by means of electric spot welding or laser spot welding.

Figure 10:
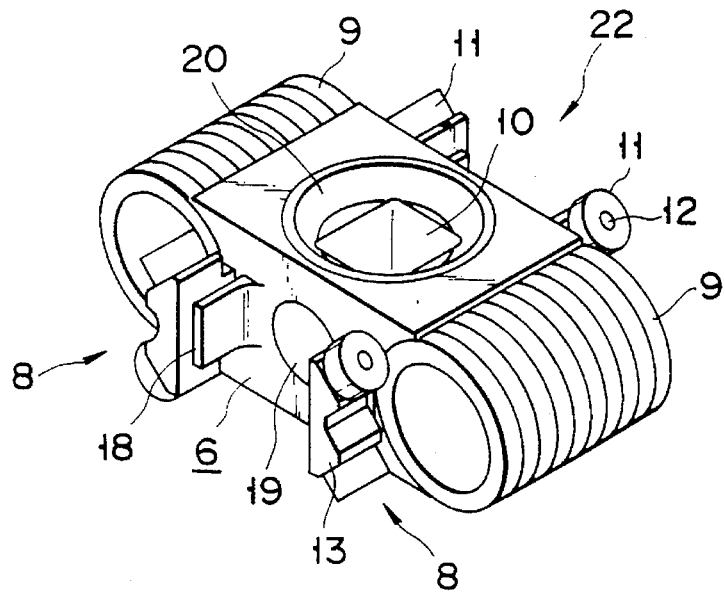
FIG. 10 is a perspective view of the assemble movable optical body shown in FIG. 7.

The radial coils 9 are fixed to the pick-up body 6 by abutting the coils 9 upon the curved faces 15 of the body 6 and adhering the coils 9 to the curved faces 15, as shown in FIG. 9. When the support units 8 and radial coils 9 are coupled to the pick-up body 6, the movable body 5 in which the pick-up unit 6, support units 8 and radial coils 9 are integrally assembled is formed, as shown in FIG. 10. Each plate spring 14 of support unit 8 is clamped between the pick-up body 6 and the associated radial coil 9. Since stepped portions are provided between the groove 16 and shallower groove 17, a clearance is produced between the plate spring 14 and the bottom wall of the groove 16 and the plate spring 14 is deformably fixed on the pick-up body 6. Accordingly, the rollers 11 and roller blocks 13 are supported by the movable optical body 5 so as to be slightly deformable in Z-direction by virtue of elasticity of the plate spring 14.

Figure 11:
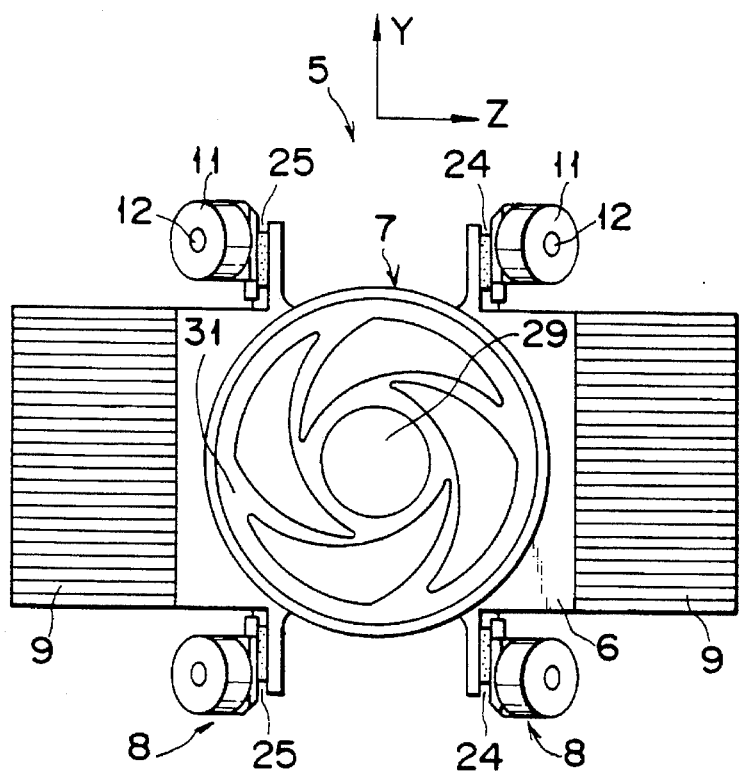
FIG. 11 is a plan view showing the movable optical body assembled and adjusted with respect to inclination.

When the rollers 11 are put in contact with the rails or guide shafts 4, gaps 23 are produced between the rear faces of the roller blocks 13 and the side faces of the support unit stoppers 18. As is shown in FIG. 11, two gaps 23 on one side are filled with a coagulating agent 24 such as an adhesive, and the other two gaps 23 are filled with an elastic material 25 such as silicone gel.

The magnetic support rails or guide shafts 4 are made of a magnetic permeable material, and function as yokes of a magnetic circuit 26 for applying magnetic fields to the radial coils 9. The magnetic support rails 4 penetrate the coils 9 such that slight gaps are provided between the inner surfaces of the coils 9 and the outer surfaces of the rails 4. The support rails 4 abut on the rollers 11 of the support unit 8. As is shown in FIGS. 5 and 6, a pair of substantially U-shaped back yokes 27 are arranged on the frame 1 so as to be substantially symmetrical with respect to XY-plane. The back yokes 27 are fixed on the frame 1 by means of screws. A magnet 28 is attached to the inside surface of each back yoke 27. The magnet 28 extends in Y-direction, facing the associated magnetic support 4 with a gap. Both end portions of each support rail or guide shaft 4 are coupled to mutually facing ends of the associated bent back yoke 27. Each of the two magnetic circuit 26 comprises the support rail or guide shaft 4, back yoke 27 coupled to both ends of the rail 4, and magnet 28 fixed to the back yoke 27. The magnetic circuit 26 generates a magnetic flux interlinked with the radial coil 9. The magnetic circuit 26 and radial coil 9 constitute a linear motor serving as a moving force applying means for exerting a moving force to the movable optical body 5 including the pick-up body 6.

Figure 12:
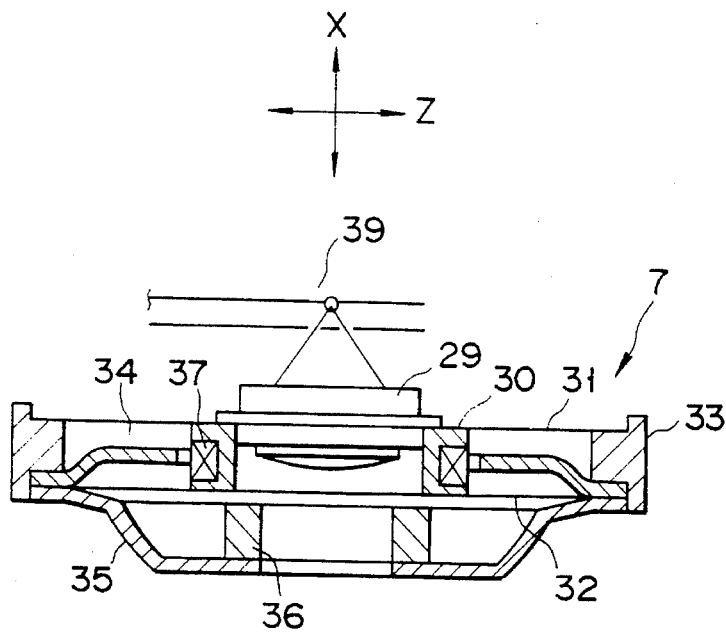
FIG. 12 is a cross-sectional view showing a focus unit of the movable optical body shown in FIG. 7.

The focus unit 7 comprises, as shown in FIG. 12, an objective lens 29 for focusing a light beam, a lens holder 30 for holding the objective lens 29, a pair of diaphragm springs 31 and 32 for clamping the lens holder 30, a ring 33, an inner yoke 34, an outer yoke 35, a focus magnet 36, and a focus coil 37. The lens holder 29 is held by the lens holder 30, and the lens holder 30 is held by the diaphragm springs 31 and 32.

The upper diaphragm spring 31 is held by the ring 33 at its outer peripheral part, and the lower diaphragm spring 32 is held by the inner yoke 34 and outer yoke 35 at its outer peripheral part. Thus, both springs 31 and 32 are fixed to the ring 33. Each of the inner yoke 34 and outer yoke 35 has a substantially uniform thickness, and has a ring shape with a hole formed at its center area. The inner peripheral part of each yoke 34, 35 is recessed, and the yokes 34 and 35 are coupled to each other such that the recessed parts of both yokes 34 and 35 face each other. The inner peripheral part of the inner yoke is situated between the diaphragm springs 31 and 32. The ring-shaped focus magnet 36 magnetized in X-direction is fixed concentrically to the inner peripheral part of the outer yoke 35. Part of the recess of the outer yoke 35 forms a spherical seat to be engaged with the pick-up body 6.

A focus magnetic circuit is constituted by the inner yoke 34, outer yoke 35 and focus magnet 36. The focus magnetic circuit generates a magnetic flux interlinked with the focus coil 37 wound around the lens holder 30. The focus magnetic circuit and the focus coil 37 constitute a voice coil motor functioning as a moving force applying means for applying a moving force to the lens holder 30 (holding objective lens 29) in X-direction.

Figure 13:
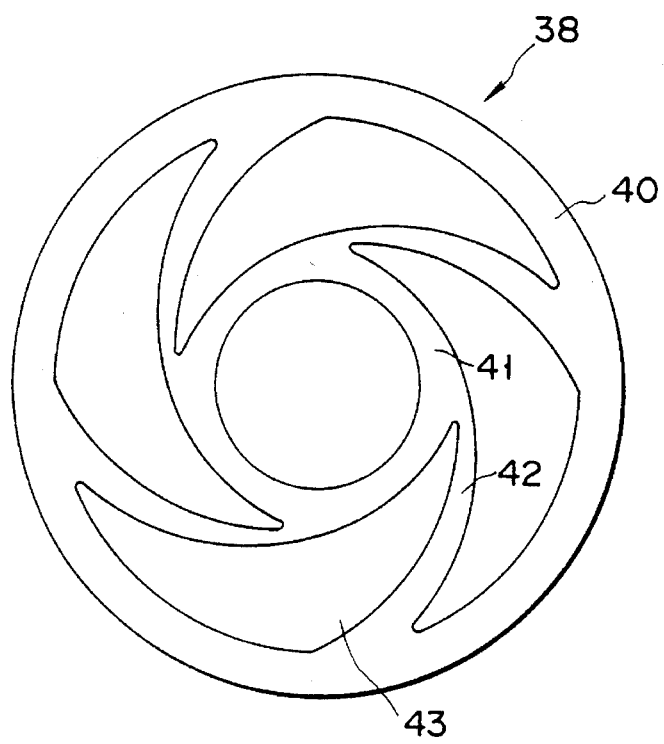
FIG. 13 is a plan view showing a diaphragm of the focus unit of FIG. 12.
Figure 16:
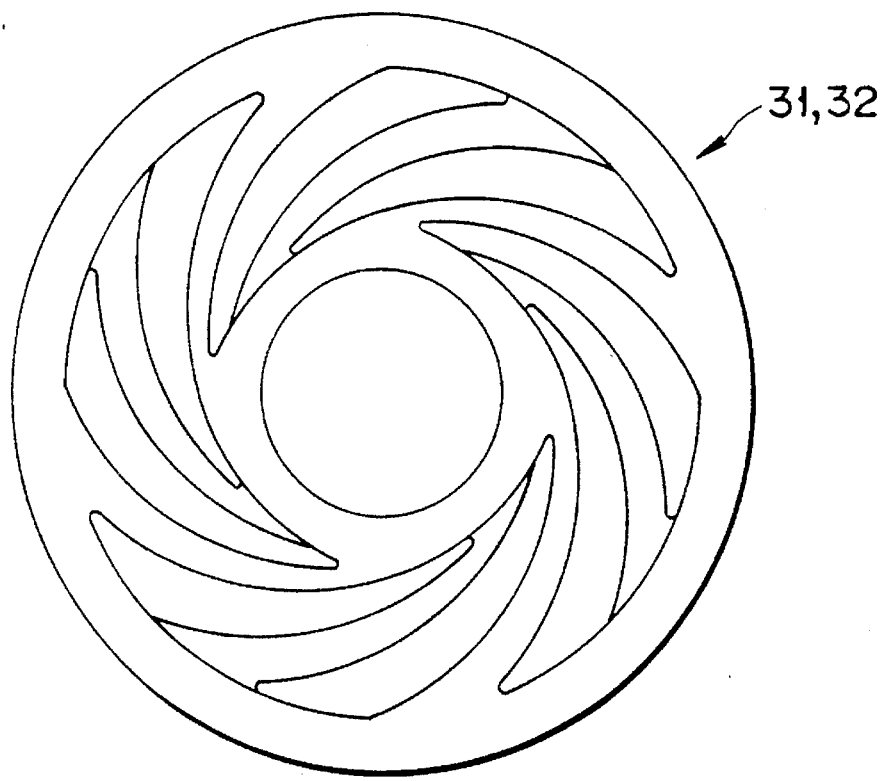
FIG. 16 is a plan view showing the state of lamination of the diaphragm spring shown in FIG. 15.

Each of the diaphragm springs 31 and 32 is constituted by laminating a plurality of diaphragm springs 38 (one of which is shown in FIG. 13). The diaphragm spring 38 comprises an outer ring portion 40, an inner ring portion 41 and leg portions 42. These portions 40, 41 and 42 are formed integrally by means of etching or pressing. The area of each leg portion 42 is smaller than a space 43 defined between adjacent leg portions 42. A plurality of diaphragm springs 38 formed by etching or pressing, as shown in FIG. 14, are laminated at different phases, as shown in FIG. 15, such that the spaces 43 of each spring 38 are covered by the leg portions 42 of vertically adjacent springs 38. Thus, the laminated body of springs 38 is formed, as shown in FIG. 16. More specifically, only hatched portions in FIG. 14 (outer and inner ring portions) of springs 38 are put in contact. The laminated diaphragm springs 38 are coupled at inner ring portions 41 and outer ring portions 40 by means of adhesion, laser spot welding, electric spot welding, or diffusion welding.

A stationary optical unit 44 is attached to one end of the frame 1 along the axis of Y-direction. A laser beam emitted from a laser diode 45 is passed through various optical elements and radiated in Y-direction through the center part of the frame 1. The light beam is then guided in X-direction by the mirror unit 10 mounted on the movable optical body 5. The beam passes through the objective lens 29 and is focused on the recording surface 39 of the disk. The mirror unit 10 is slightly rotatable about Z-axis. The mirror unit 10 is rotated to shift the focal point in Y-direction, thereby effecting fine, precise adjustment of the focal point.

A stopper 46 having a laser beam passage hole is provided near the laser beam emission portion of the stationary optical unit 44. The stopper 46 projects from the frame 1. The contact portion between the stopper 46 and the pick-up body 6 is provided with an elastic body such as rubber. The center of figure of the contact portion agrees with the center of gravity of the movable optical body 5 in X- and Y-directions, and also agrees substantially with the optical axis of the laser beam emitted from the stationary optical unit 44. Thus, the center of figure of the contact portion agrees substantially with the optical axis.

A spindle motor 47 is attached to the other end of the frame 1 along the axis of Y-direction. A stopper 48 is attached to the base of the spindle motor 47. The contact portion between the stopper 48 and the pick-up body 6 is provided with an elastic body such as rubber. The center of figure of the contact portion agrees with the center of gravity of the movable optical body 5 in X- and Z-directions.

A flexible guide 49 extending in Y-direction at least to the center of rotation of rollers 11 is attached to the Y-axial end face of the pick-up body 6. The flexible guide 49 is provided with a flexible print board bent in a substantially U-shape, and supplies an electric current to coils (not shown) to drive the radial coils 9, focus coil 37 and mirror unit 10.

Since the optical disk apparatus of this invention has the above structure, the electric power to the radial coils 9 is controlled to shift the focal point of the beam in the radial direction of the disk. The power to the focus coil 37 is controlled to shift the focal point in the focusing direction perpendicular to the disk surface, and the power to the coils (not shown) for driving the mirror unit 10 is controlled to finely shift the focal point in the radial direction. In addition, the following novel effects and advantages can be obtained.

In the access mechanism for moving the objective lens 29 in the radial direction of the optical disk, the movable optical body 5 is supported by the support units 8 having two plate springs 14. As a result, the movable optical body 5 is brought into contact with the magnetic support rails or guide shafts 4 via elastic members. Accordingly, high-frequency vibration of the magnetic support rails or guide shafts 4 is not transmitted to the movable optical body 5, and stable control operation can be carried out. In addition, since the connecting portions between the support units 8 and the pick-up body 6 are situated at center parts of the plate springs 14 of the support units, deformation of each plate spring 14 due to pressing force occurs symmetrically and a stress does not concentrate on the connecting portions. Thus, connection at the connecting portions is firm.

The elastic material for supporting the roller block 13 is constituted by a plate spring element having a plane substantially parallel to Y-direction in which the movable optical body moves. Thus, the elastic material has high elasticity in Z-direction but is hard in the direction in which the optical body moves.

The pin block 13 is formed of resin and is injection-molded integrally with the metal plate springs 14 and pins 12. Thus, the relative position and angle of each roller pin can be kept constant, the roll resistance is not increased due to the positional displacement or angle displacement, and smooth movement is attained.

The gaps 23 of less than 1 mm are provided between the support unit stoppers 18 and the roller blocks 13 of the pick-up body 6. After the support units 8 are fixed to the pick-up body 6, at least two of the four gaps 23 are filled with coagulating agent. It is thus possible to utilize the elasticity of the plate springs 14 after assembly, adjust the angle of the pick-up body 6 to set the optical axis at an optimal angle, and then fill adhesive to at least two gaps to maintain the optimal condition.

The gaps 13 of less than 1 mm are provided between the roller blocks 13 and the support unit stoppers 18. After the support units 8 are fixed to the pick-up body 6, at least one of the gaps is filled with visco-elastic agent 25 such as silicone. Therefore, the vibration of the pick-up body 6 can effectively be damped, and high precision control operation can be carried out.

The plate springs 14 and pick-up body 6 are formed of a metallic material and these are fixed by means of caulking or welding means such as electric spot welding or laser spot welding. Thus, the springs 14 can be firmly fixed to the pick-up body 6.

The plate spring element of the support unit is fixed between the pick-up body 6 and the radial coil 9 for driving the pick-up body 6, the rollers are situated outside the end portions of the coil 9, and the yoke penetrating the coil functions also as the guide shaft for the roller. Thus, the support points of the pick-up body 6 can be made closer to the drive points of the pick-up body 6, and abnormal resonance can be prevented.

The drive center of the movable optical body 5 on which the objective lens 29 is mounted agrees substantially with the center of figure of the plane at which the stopper contacts with the pick-up body 6. Thus, when the pick-up body 6 collides with the stopper, the moment to rotate the pick-up body 6 is not generated and the bearings are not damaged. In addition, since the center of figure coincides with the optical axis, the adverse affect of vibration on the optical detection system can be reduced to a minimum.

The optical axis of the light passage between optical elements penetrates the center of gravity of the movable optical body 5, the ring-shaped stopper 46 is provided between the pick-up body 6 and the stationary optical element, and the center of figure of the contact face between the stopper and the pick-up body 6 coincides substantially with the center of the light passage. Thus, when the pick-up body 6 collides with the stopper, the moment to rotate the pick-up body 6 is not generated and the bearings are not damaged.

Since the stopper 48 is provided on the spindle motor 47, the distance between the spindle motor and the pick-up body 6 can be precisely determined, and therefore the pick-up body 6 does not collide with the spindle motor.

The flexible guide 49 extending in Y-direction at least to the center of rotation of rollers 11 is attached to the Y-axial end face of the pick-up body 6, and the flexible guide 49 is provided with a flexible print board bent in a substantially U-shape. Therefore, the flexible print board does not contact with the rollers 11 at any point, and a stable, long life of the flexible print board can be obtained.

The focus unit 7 for driving the objective lens 29 in the focusing direction comprises at least the two yokes, magnet, diaphragm springs, and ring. The outer peripheral portion of one of the diaphragm springs is clamped by the two yokes. The other yoke has the spherical seat to be fixed to the pick-up body 6. Thus, the objective lens support system with an inclination adjustment function and high rigidity in radial direction can be obtained.

One of the yokes is situated between the two diaphragm springs, and the coil 37 wound around the lens holder 30 for supporting the objective lens 29 is also situated between the two diaphragm springs. Thus, the yokes function as mechanical stoppers and prevent the objective lens 29 from projecting excessively and damaging the recording medium.

Since the coil is situated between the two diaphragm springs, the mass is concentrated between the two diaphragm springs. Thus, it is not necessary to provide an excess counterweight for setting the center of gravity at the center of the two diaphragms. The drive acceleration in the focusing direction can be increased, and the rigidity in the radial direction is enhanced.

The diaphragm springs 31 and 32 and the ring 33 for fixing the outer peripheral portions of the springs 31 and 32 are formed of metal, and the springs 31 and 32 and ring 33 are coupled by means of laser spot welding or electric spot welding. Thus, the objective lens supporting system with high rigidity along the radial axis can be obtained.

Each of diaphragm springs 31 and 32 is constituted by laminating a plurality of diaphragm springs 38 such that the diaphragm springs 38 are rotated about their axes at different phases. Thus, the objective lens supporting system with high rigidity can be obtained.

Since the diaphragm springs 38 are coupled by means of diffusion coupling to constitute a diaphragm unit, the objective lens supporting system with high rigidity along the radial axis can be obtained.

Embodiment 2

Figure 17:
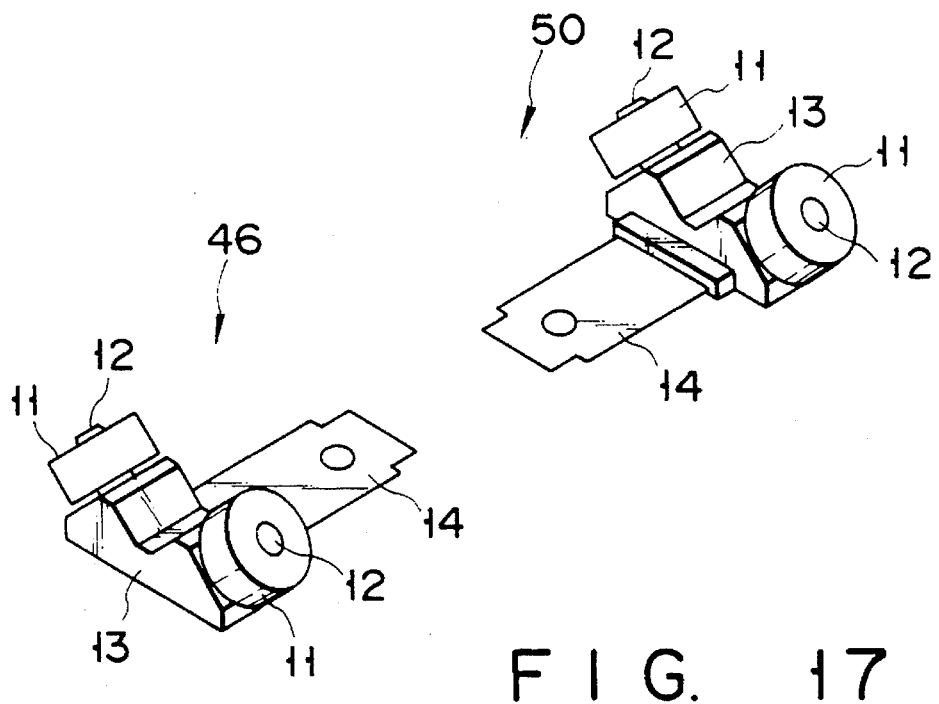
FIG. 17 is a perspective view for illustrating a support unit for an optical disk apparatus according to an another embodiment of the invention.

According to the optical disk apparatus of the first embodiment, the support unit is constituted such that two rollers are provided at both ends of the plate spring. However, as shown in FIG. 17, it is possible to substitute two support units 8 for the support unit 8. In each support unit 8, two rollers are provided only at one end of the plate spring.

In the optical disk apparatus with the above structure, even if the plate spring 14 has a curvature, the plate spring 14, roller block 13 and pins 12 can be injection-molded integrally with high precision. Thus, it is easy to obtain such a structure that the plate spring is stretched in a flat shape and a pre-load is applied, in the state that the rollers 11 are put in contact with magnetic support rails or guide shafts 4. It is possible to enhance the precision of angle setting for the pins and magnetic support rails 4 (guide shafts). Therefore, there can be obtained a stable product in which no variation exists in rolling frictional resistance between the rollers 11 and the magnetic support rails (guide shafts) due to solid differences.

Embodiment 3

Figure 18:
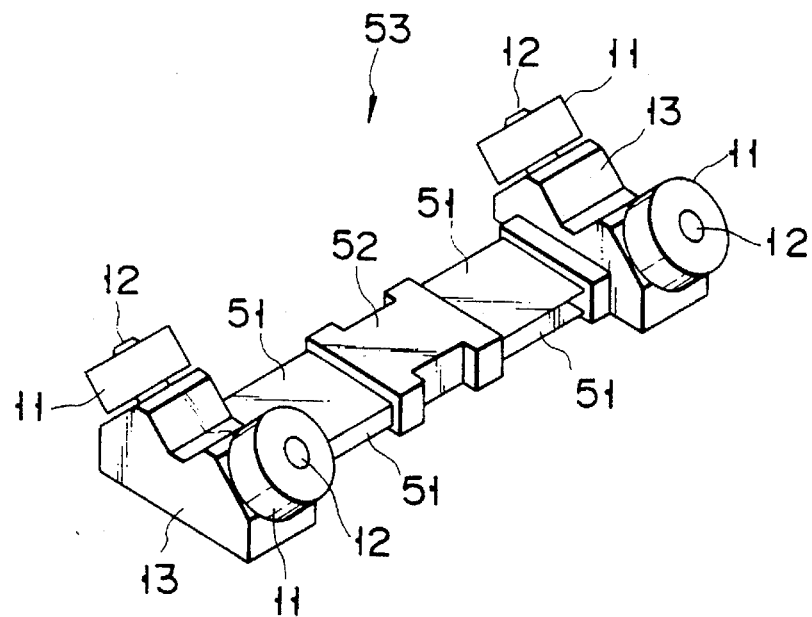
FIG. 18 is a perspective view for illustrating a support unit for an optical disk apparatus according to a still another embodiment of the invention.

According to the optical disk apparatus of the first embodiment, the support unit is constituted such that two rollers are provided at both ends of the plate spring. However, as shown in FIG. 18, it is possible to use a plate spring comprising a plurality of parallel plate springs and attaching a fixed block 52 at a middle part of the plate spring. The support units 8 may be replaced by two support units 53 each comprising roller blocks 13 at both ends, fixed block 52 and plate springs 51.

The optical disk apparatus according to the third embodiment of the present invention has the same advantages as the apparatus according to the first embodiment. The third embodiment has the following novel effect. The rollers 11 are elastically supported by the parallel plate spring mechanism. Thus, even if the plate spring is deformed to apply a pre-load, the relationship in angle between the roller shafts and the magnetic support rails (guide shafts) can be kept unchanged. Therefore, the rolling resistance does not increase due to the departure from the predetermined angles of the roller shafts and magnetic support rails (guide shafts), and smooth movement can be attained.

Furthermore, when the roller block is formed of resin and the block, pins, rollers and parallel plate spring elements are injection-molded integrally, the precision of the relative angle and relative position of the pins can be further enhanced, and the rolling resistance does not increase due to the departure from the predetermined position and angles, and smooth movement can be attained.

Embodiment 4

Figure 19:
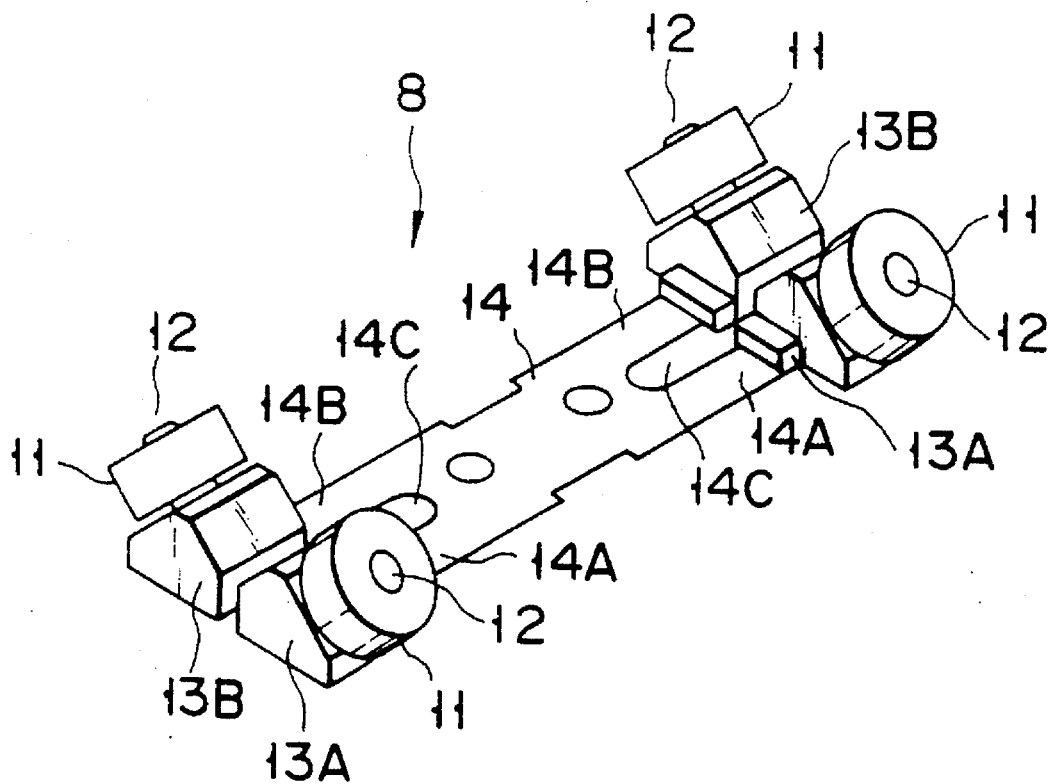
FIG. 19 is a perspective view for illustrating a support unit for an optical disk apparatus according to a yet another embodiment of the invention.

In the support unit 8 shown in FIG. 8, two roller blocks 13 are fixed at both ends of the plate spring 14. A pair of steel rollers 11 are rotatably fixed to each roller block 13, and the rollers 11 of each pair are supported movably by the plate spring 14. However, as shown in FIG. 19, it is possible that the respective rollers 11 are supported by the plate spring 14 so as to be movable independently. Specifically, as shown in FIG. 19, the plate spring 14 has notches 14C extending inwards from both ends in the longitudinal direction. Each end portion of the plate spring 14 is separated into a pair of tongues 14a and 14B which are deformable independently. Roller block segments 13A and 13B are fixed to the tongues 14A and 14B. Like the support unit 8 shown in FIG. 8, pins 12 are fixed to the roller block segments 13A and 13B, and steel rollers 11 are rotatably attached to the pins 12. The paired pins 12 are fixed to the paired roller block segments 13A and 13B such that the center axes of the pins 12 cross each other in the non-deformed state of the plate spring 14, like the support unit 8 shown in FIG. 8. The four roller block segments 13A and 13B are coupled by the plate spring 14. The four roller block segments 13A and 13B are made of a high-rigidity engineering plastic material, like the support unit 8 shown in FIG. 8. The block segments 13A and 13B are formed by injecting plastic material into a mold while four pins 12 and plate spring 14 are fixed in the mold.

In the support unit 8 shown in FIG. 19, when the rollers 11 are mounted on the support rails or guide shafts 4, four gaps 23 are produced between the rear faces of the roller block segments 13A and 13B and the support unit stoppers 18, as shown in FIG. 7. The four gaps of one of the support units 8 are filled with a coagulating agent 24 such as an adhesive, and the four gaps of the other support units 8 are filled with a visco-elastic material 25 such as silicone gel. According to the support unit 8 shown in FIG. 19, the four gaps 23 are provided between the rear faces of the roller block segments 13A and 13B and the side faces of the support unit stoppers 18. Since the size of each gap is adjustable, the degree of freedom of adjustment is high at the time of assembling the optical disk apparatus, and fine adjustment can be ensured.

Embodiment 5

Figure 20:
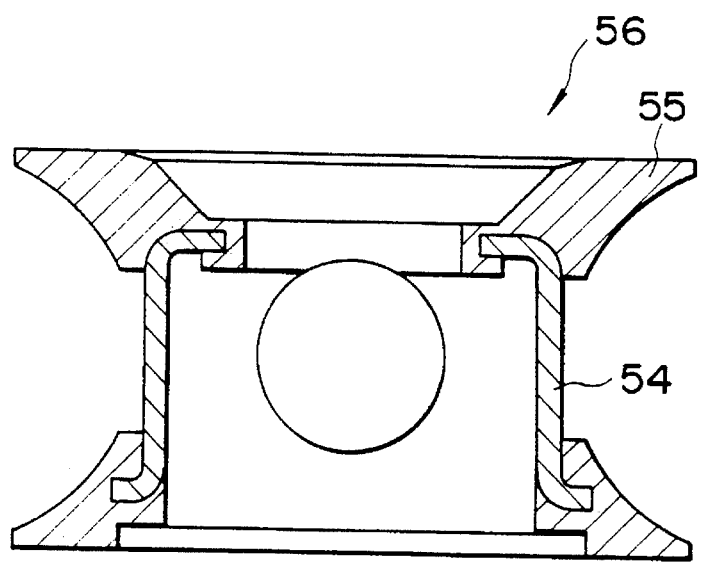
FIG. 20 is a cross-sectional view showing a pick-up body of an optical disk apparatus according to a further embodiment of the invention.

In the first embodiment, the pick-up body 6 is formed of a single material; however, as shown in FIG. 20, it is possible to integrally form a pick-up body 56 of metal material 54 and resin material 55 by means of injection molding. The metallic contact portions of the body 56 with the plate springs are exposed.

The fourth embodiment has the following novel advantage, in addition to the advantages obtainable with the first embodiment. Where the connection portion between between the support member and the pick-up body is made of a metal, the support unit and the pick-up body can be coupled by means of welding such as electric spot welding or laser spot welding. Thus, the support unit and the pick-up body 6 can be coupled firmly, and the insulation effect of the coil can be enhanced.

Embodiment 6

Figure 21:
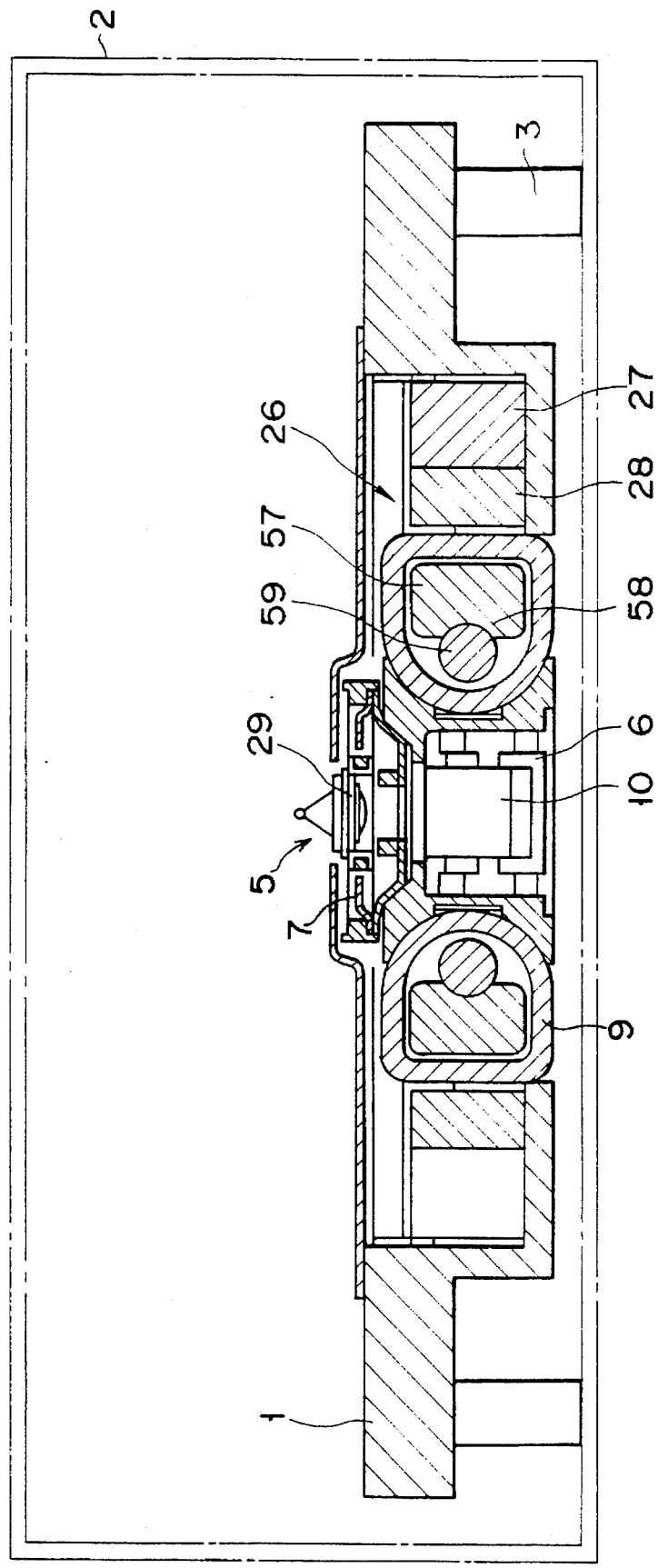
FIG. 21 is a cross-sectional view for illustrating a yoke and a guide shaft of an optical disk apparatus according to a still further embodiment of the invention.

In the first embodiment, the magnetic support rail (guide shaft) 4 is used as part of the yoke of the magnetic circuit; however, as shown in FIG. 21, the yoke may be provided with a V-groove in which the guide shaft is fixed.

According to the fifth embodiment, the following novel advantage can be obtained, in addition to the advantages obtainable with the first embodiment. That is, the coupling layer between the V-groove and the guide shaft can effectively damp the vibration of the guide shaft, and high precision control operation can be achieved.

As has been described above in detail, the optical disk apparatus of the present invention has the following advantages:

(1) The high-frequency vibration of the magnetic support rails (guide shafts) 4 is not transmitted to the movable optical body 5, and stable control operation can be carried out.

(2) The support unit has a high elasticity in a direction in which a pre-load is applied, and a high rigidity in a direction in which the support unit moves.

(3) Utilizing the elasticity of the plate spring 14 after assembly, it is possible to adjust the inclination angle of the pick-up body 6 so as to set the optical axis at an optimal angle. Thereafter, at least two of gaps are filled with a thermosetting, room temperature setting, or photo-setting adhesive or filler, and the desired state of the optical axis is maintained.

(4) vibration can effectively be damped, and high-precision control operation can be carried out.

(5) when the pick-up body 6 collides with the stopper, the moment to rotate the pick-up body 6 is not generated, and the bearings are not damaged.

(6) Since the distance between the spindle motor and the pick-up body 6 can be exactly determined, the pick-up body 6 does not collide with the spindle motor.

(7) The focus unit 7 having the structure of the present invention has an inclination adjustment function, and a high rigidity along the radial axis. The mass of the movable section can be reduced. The objective lens support system with high driving acceleration in the focusing direction can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A structure for supporting an objective lens movably along the optical axis of the lens, comprising:
    a lens holder for holding the objective lens;
    a frame;
    first and second diaphragms arranged substantially in parallel, a center part of the diaphragm suspending the lens holder movably along the optical axis, wherein each of said first and second diaphragms comprises:
    an outer frame connected to said frame;
    at least two spiral deformable spring elements connected between the outer frame and the center part of a corresponding one of said first and second diaphragms,
    wherein said first and second diaphragms are stacked together and rotated in a circumferential direction a predetermined phase from each other;
    a magnet unit, fixed to the lens holder, for generating a first magnetic field; and
    means, fixed to the frame, for generating a second magnetic field interlinked with the first magnetic field.

2. The apparatus according to claim 1, wherein said means for generating the second magnetic field includes a permanent magnet and a yoke.

3. The apparatus according to claim 1, wherein said unit for generating the first magnetic field includes an electromagnetic coil.

4. The apparatus according to claim 1, wherein said frame has a spherical seat.

5. A structure according to claim 1, wherein:
    said first and second diaphragms are rotated a predetermined phase from each other so that the deformable springs elements bend without contacting each other.

6. A structure according to claim 5, wherein the first and second diaphragms are made of metal.

7. A structure according to claim 6, wherein:
    said first and second diaphragms are rotated a predetermined phase from each other so that the deformable springs elements bend without contacting each other.

8. A structure according to claim 7, wherein the first and second diaphragms are made of metal.

9. An apparatus for moving an objective lens linearly along an optical memory and moving the objective lens along the optical axis of the objective lens, comprising:
    a lens holder for holding the objective lens;
    first and second diaphragms arranged substantially in parallel, a center part of the diaphragms suspending the lens holder movably along the optical axis, each of the first and second diaphragms including an outer frame, and at least two spiral deformable Spring elements connected between the outer frame and the center part thereof, the first and second diaphragms being stacked together and rotated in a circumferential direction a predetermined phase from each other;
    a unit, fixed to the lens holder, for generating a first magnetic field,
    a frame to which the outer frames of the first and second diaphragms are fixed;
    means, fixed to the frame, for generating a second magnetic field interlinked with the first magnetic field;
    a carrier on which the frame is mounted;
    means for supporting the carrier movably;
    means for elastically coupling the carrier to the supporting means, said carrier, said supporting means and said coupling means being arranged symmetrically with respect to an axis crossing the optical axis;
    guide means for guiding the carrier, on which the supporting means is movably mounted, said guide means extending in the direction of movement of the carrier; and moving means for moving the carrier along the axis of movement.

10. The apparatus according to claim 9, wherein said moving means includes:

first and second electromagnetic coils fixed to the carrier and arranged symmetrically with respect to the axis of movement, for generating magnetic fields; and magnet means for generating a magnetic field interlinked with the magnetic fields of the first and second electromagnetic coils.

11. The apparatus according to claim 9, wherein said guide means includes a pair of guide rails extending in the direction of movement of the carrier, the guide rails being inserted into the first and second electromagnetic coils, and said supporting means includes first and second pairs of rollers, which can be rolled on one of the guide rails, and third and fourth pairs of rollers, which can be rolled on the other guide rail.

12. The apparatus according to claim 11, wherein said guide rails include a section for guiding a magnetic field from the magnet means.

* * * * *